F. SALÉ.
NIPPERS.
APPLICATION FILED JUNE 30, 1910.

987,173.

Patented Mar. 21, 1911.

Witnesses:
Arthur E. Junger.
Katheryn Koch.

Inventor:
Friedrich Salé
by his attorney
Frank K. Briere

UNITED STATES PATENT OFFICE.

FRIEDRICH SALÉ, OF DUSSELDORF, GERMANY.

NIPPERS.

987,173.

Specification of Letters Patent.  Patented Mar. 21, 1911.

Application filed June 30, 1910. Serial No. 569,634.

*To all whom it may concern:*

Be it known that I, FRIEDRICH SALÉ, a citizen of Germany, residing at Dusseldorf, Germany, have invented a new and useful Improvement in Nippers, of which the following is a specification.

This invention relates to nippers of novel construction, more particularly adapted to facilitate the picking up and the manipulation of gems or similar small objects by jewelers.

Figure 1:
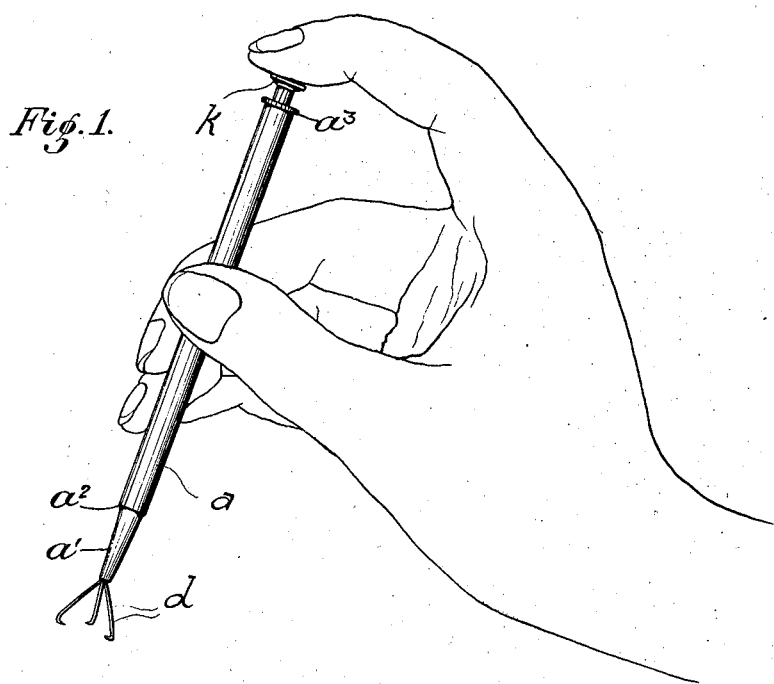
Figure 2:
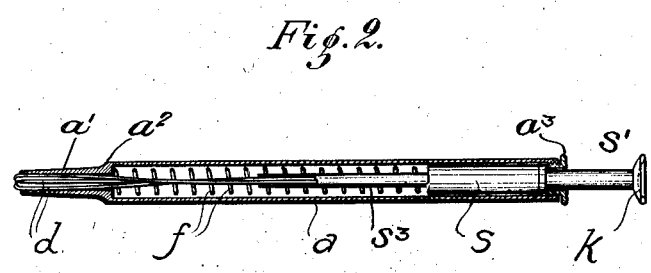

In the accompanying drawing: Figure 1 is a perspective view of my improved nippers, and Fig. 2 a longitudinal section thereof.

A tubular casing or handle $a$ is provided at one end with a tapering nipple $a'$ of reduced diameter whereby an annular shoulder $a^2$ is formed between said casing and nipple. At its other end, casing $a$ is internally threaded for the reception of a perforated screw cap $a^3$ having a rim, the diameter of which exceeds that of casing $a$. Within casing $a$ is movable a cylindrical plunger $s$ provided with a reduced stem $s'$ that passes outward through the perforation of cap $a^3$ and carries a finger piece or knob $k$. At its opposite end, plunger $s$ has a socketed rod $s^3$ into which are fitted a plurality of resilient shanks $d$ that are provided with hook-shaped ends or jaws directed toward each other. Intermediate shoulder $a^2$ and plunger $s$ is provided a spring $f$ which tends to force plunger $s$ against cap $a^3$, thereby drawing the jaws into nipple $a'$. The shanks of the clutches or spring jaws $d$ are not parallel, but are coiled upon one another, at a point about midway between the claws and the plunger $s$. In this way the resiliency and spread of the jaws are considerably augmented, and when the plunger is depressed, the jaws will uncoil and spread a considerable distance with great energy. When the plunger is raised, the claws will rapidly contract around the article to be held and will firmly grasp the same, owing to the intercoiling of their shanks, as they are drawn into the casing.

I claim—

A device of the character described, comprising a tubular casing, a nipple of reduced diameter provided at one end of the casing, a shoulder intermediate the casing and nipple, a perforated screw cap tapped into the casing at its other end and having a rim, the diameter of which exceeds that of the casing, a plunger movable in the casing and having at one end a reduced knob-carrying stem that passes outwardly through the cap-perforation, a socketed rod at the other end of the plunger, a plurality of resilient intercoiled shanks fitted into the rod-socket and having jaws that are adapted to be projected outwardly through the nipple, and a spring intermediate the shoulder and plunger that tends to draw the jaws into the nipple.

FRIEDRICH SALÉ. [L. S.]

Witnesses:
 WALTER VANNEGUT,
 ALFRED HENKEL.